Sept. 20, 1927.
E. H. SCHMIDT
1,643,052
SHOCK ABSORBING MECHANISM
Filed Jan. 6, 1926     2 Sheets-Sheet 1
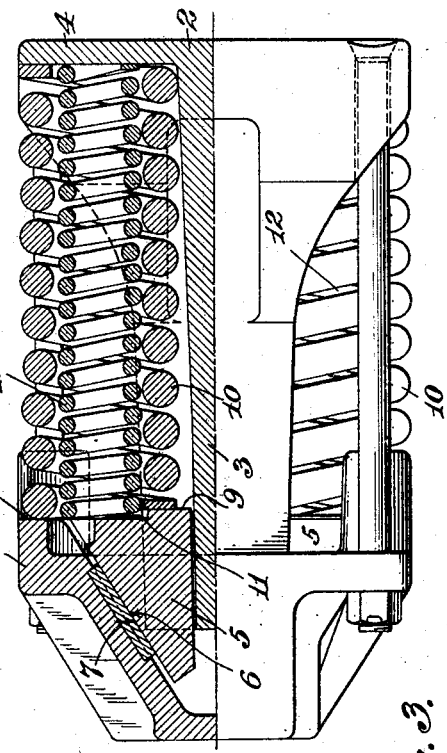
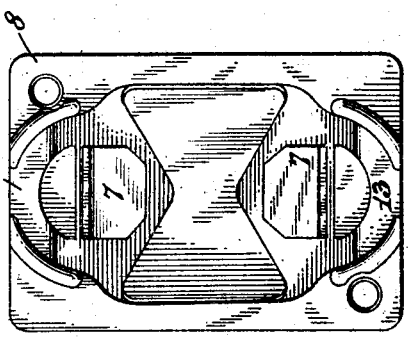
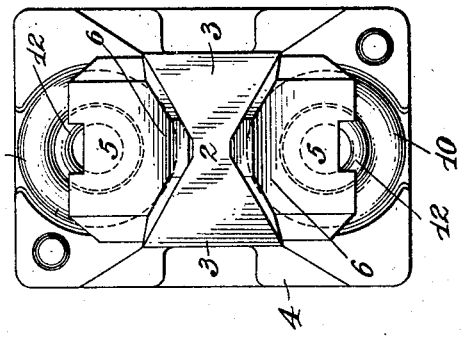
Inventor
Ernest H. Schmidt
By his Attorney
Clarence D. Kerr Sept. 20, 1927. 1,643,052
E. H. SCHMIDT
SHOCK ABSORBING MECHANISM
Filed Jan. 6, 1926   2 Sheets-Sheet 2
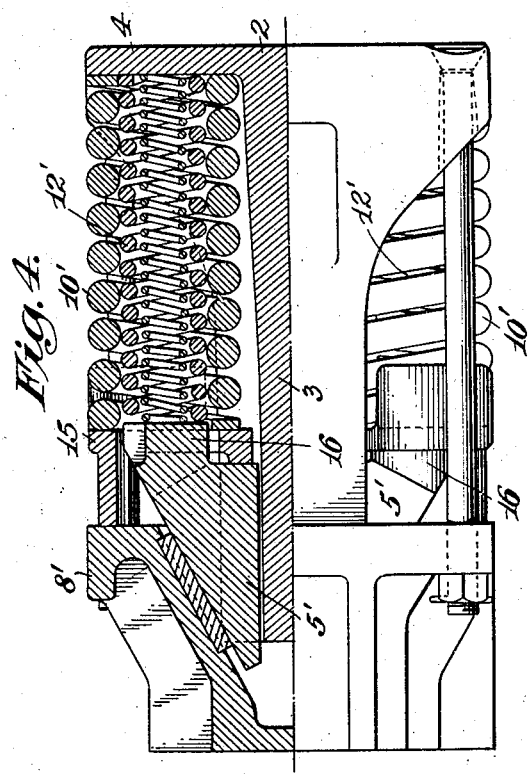
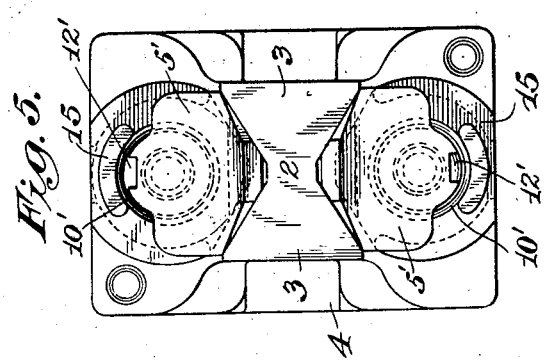
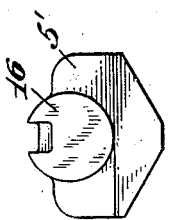
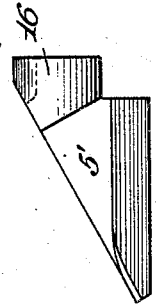
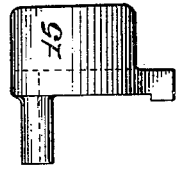
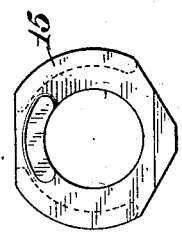
Inventor
*Ernest H. Schmidt*
By his Attorney
*Clarence Kerr*

Patented Sept. 20, 1927.

1,643,052

UNITED STATES PATENT OFFICE.

ERNEST H. SCHMIDT, OF CLEVELAND, OHIO, ASSIGNOR TO NATIONAL MALLEABLE AND STEEL CASTINGS COMPANY, OF CLEVELAND, OHIO, A CORPORATION OF OHIO.

SHOCK-ABSORBING MECHANISM.

Application filed January 6, 1926. Serial No. 79,603.

Fig. 1 is a plan, partly in section, of a shock absorbing mechanism embodying my invention; Fig. 2 is an end elevation thereof with the wedge follower removed; Fig. 3 is an end elevation of the inner side of the follower wedge; Fig. 4 is a plan, partly in section, of a modified form of my invention; Fig. 5 is an end elevation thereof with the wedge follower removed; Fig. 6 is an end view of a pressure transmitting member; Fig. 7 is a side elevation thereof; Fig. 8 is an end elevation of the shoe; and Fig. 9 is a side elevation of the shoe.

My invention relates to shock absorbing mechanism, and particularly to friction draft gears for railway vehicles of the type described in Letters Patent 1,192,571 of Ernest H. Schmidt, granted July 26, 1916, and 1,301,809 of Chester K. Brooks and Ernest H. Schmidt, granted April 29, 1919. My invention comprises an effective releasing means for the gear in which the spring element acts both for developing friction and for releasing the parts. My invention also comprises various features which I shall hereinafter describe and claim.

Referring to the drawings, the central friction member 2 has longitudinally-extending outwardly radiating arms 3 and terminates at its rear end in an enlarged base 4. Friction shoes 5 seat between the friction faces of the outwardly radiating arms. Each friction shoe has a wedging surface 6 engaged by the wedge surface 7 on the wedge follower 8. The rear face of the shoe has a bearing 9 for the outer coil 10 of the spring element, and also an offset bearing 11 for the inner coil 12 of the spring element. The coils 10 and 12 of the spring element bear at their rear ends against the base 4 of the central friction member 2. The outer coil 10 of the spring element at its forward end in addition to bearing against the surface 9 on the shoe also bears against the surface 13 of the wedge follower 8.

In the operation of my improved gear, as the compression abates the heavy coil 10, by reason of its bearing upon the surface 13 of the wedge 8, will cause the wedge to release from its adhesion to the shoe 5, thus permitting the force of the inner coil 12 to force the shoe 5 outwardly along the friction faces of the central member, and at the same time the bearing of the heavy spring 10 upon the shoe will also assist in driving the shoe outwardly.

The bearing 13 on the outer coil 10 is shown in advance of its bearing 9 on the shoe, so as to compensate for the movement of the shoe inwardly of the wedge occasioned by wear on the frictional surfaces of the shoe or upon the surfaces 6 and 7.

It will thus be seen that during compression the movement of the shoe is resisted by both of the coils 10 and 12 of the spring element, and that in release the heavy coil 10 will be sufficient to break the adhesion of the wedge and thus permit the coils 10 and 12 to drive the shoe outwardly to released position. This results in an extremely satisfactory release and as well preserves substantially the full capacity of the springs for generating friction between the shoes and the central friction member. If desired, the mechanism which I have just described may be applied to only one side of the gear, for which purposes it will be effective for gears of certain capacities.

In Figs. 4, 5, 6, 7, 8 and 9 I have shown a modified form of my invention in which a pressure transmitting member 15 is interposed between the outer coil 10' of the spring element and the wedge 8' and shoe 5', respectively. In this construction the shoe 5' has a dowel or rearward extension 16 which forms a bearing for the inner coil or coils 12' of the spring element. The operation of this modified form is substantially like that of the preferred form, the pressure transmitting element 15 serving to transmit pressure to and from the outer coil 10' respectively to the shoe 5' and wedge 8'.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In frictional shock absorbing mechanism, a longitudinally-extending included friction member having a plurality of longitudinally extending friction faces; a friction shoe engaging each of such faces; each shoe having an inclined wedging face; a wedge member engaging the wedging face of each shoe; a compression spring element arranged to resist the inward movement of a shoe and the wedge relative to the central friction member, said spring element also being arranged for severally releasing the wedge and the said friction shoe.

2. In frictional shock absorbing mechanism, a longitudinally-extending included friction member having a plurality of longitudinally extending friction faces; a friction shoe engaging each of such faces; each shoe having an inclined wedging face; a wedge member engaging the wedging face of each shoe; a compression spring element arranged in tandem with each shoe and having bearings on said shoe and member, said spring element being adapted when the pressure abates to move the wedge and shoe into released position.

3. In frictional shock absorbing mechanism, a longitudinally-extending included friction member having a plurality of longitudinally-extending friction faces; friction shoes engaging each of such faces; each shoe having an inclined wedging face; a wedging member engaging a wedging face of each shoe; a compression spring arranged in tandem with each shoe; said spring upon one side being adapted to exert direct pressure against the wedge and on the other side against the friction shoe.

4. In frictional shock absorbing mechanism, a longitudinally-extending included friction member having a plurality of longitudinally-extending friction faces; a friction shoe engaging each of such faces, each shoe having an inclined wedging face; a wedge member engaging a wedging face of each shoe; a compression spring arranged in tandem with each shoe and having a bearing against said wedge, said spring being adapted to develop friction between shoe and included member and to severally cause release of wedge and shoe as the pressure abates.

5. In frictional shock absorbing mechanism, a longitudinally-extending included friction member having a plurality of longitudinally extending friction faces; a friction shoe engaging each of such faces; each shoe having an inclined wedging face; a wedge member engaging the wedging face of each shoe, a compression spring element arranged in tandem with both a shoe and the wedge and disposed so as to resist the inward movement of the said shoe and the wedge relative to the central friction member, said spring element being arranged to transmit pressure simultaneously both to said friction shoe and said wedge.

6. In frictional shock absorbing mechanism, a longitudinally-extending included friction member having a plurality of longitudinally extending friction faces; a friction shoe engaging each of such faces; each shoe having an inclined wedging face; a wedge member engaging the wedging face of each shoe; a compression spring element comprising a plurality of nested coils arranged to resist the inward movement of a shoe and a wedge relative to the included friction member, at least one of the coils being arranged for severally releasing the wedge and the said friction shoe.

7. In frictional shock absorbing mechanism, a longitudinally-extending included friction member having a plurality of longitudinally extending friction faces; a friction shoe engaging each of such faces; each shoe having an inclined wedging face; a wedge member engaging the wedging face of each shoe; a compression spring element arranged to resist the inward movement of a shoe and the wedge relative to the central friction member, said spring element having independent bearings for the wedge and for the shoe and said independent bearings forming means with the said element for severally releasing the wedge and shoe.

8. In frictional shock absorbing mechanism, a longitudinally-extending included friction member having a plurality of longitudinally extending friction faces; a friction shoe engaging each of such faces; each shoe having an inclined wedging face; a wedge member engaging the wedging face of each shoe; a compression spring element arranged to resist the inward movement of a shoe and the wedge relative to the central friction member, said spring element having on one side a bearing for the wedge and on the other a bearing for the shoe and being arranged for severally releasing the wedge and shoe, the bearing of the spring element upon the shoe being offset relative to its bearing on the wedge to compensate for wear on the shoe relative to the included friction member and the wedge.

9. In frictional shock absorbing mechanism, a longitudinally-extending included friction member having a plurality of longitudinally-extending friction faces; a friction shoe engaging each of such faces; one of said shoes having an inclined wedging face; a wedge member engaging the said wedging face; a compression spring element arranged to resist the inward movement of said shoe and the wedge relative to the central friction member, said spring element also being arranged for severally releasing the wedge and the said friction shoe.

ERNEST H. SCHMIDT.